(12) United States Patent
Taguchi et al.

(10) Patent No.: US 10,670,781 B2
(45) Date of Patent: Jun. 2, 2020

(54) MIRROR WITH IMAGE DISPLAY FUNCTION AND HALF MIRROR

(71) Applicant: FUJIFILM Corporation, Tokyo (JP)

(72) Inventors: Takao Taguchi, Minamiashigara (JP); Katsuyuki Takada, Minamiashigara (JP); Mikio Tomaru, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/165,096

(22) Filed: Oct. 19, 2018

(65) Prior Publication Data

US 2019/0056540 A1 Feb. 21, 2019

Related U.S. Application Data

(63) Continuation of application No. PCT/JP2017/013882, filed on Apr. 3, 2017.

(30) Foreign Application Priority Data

Apr. 21, 2016 (JP) ................................. 2016-085025
Aug. 31, 2016 (JP) ................................. 2016-169864

(51) Int. Cl.
*G02B 5/08* (2006.01)
*G02B 27/01* (2006.01)
(Continued)

(52) U.S. Cl.
CPC .............. *G02B 5/0858* (2013.01); *G02B 5/26* (2013.01); *G02B 5/3016* (2013.01); *G02B 5/3083* (2013.01); *G02B 2027/0118* (2013.01)

(58) Field of Classification Search
None
See application file for complete search history.

(56) References Cited

U.S. PATENT DOCUMENTS

2002/0036735 A1\* 3/2002 Arakawa .............. G02B 5/3016
349/115
2006/0171030 A1 8/2006 Umeya
(Continued)

FOREIGN PATENT DOCUMENTS

JP 2004-184491 A 7/2004
JP 2004-184575 A 7/2004
(Continued)

OTHER PUBLICATIONS

Japanese Office Action for corresponding Japanese Application No. 2016-169864, dated Aug. 27, 2019, with English translation.
(Continued)

*Primary Examiner* — Ryan Crockett
(74) *Attorney, Agent, or Firm* — Birch, Stewart, Kolasch & Birch, LLP

(57) ABSTRACT

A mirror with an image display function includes in order: an image display device; a ¼ wavelength plate; a circular polarization reflection layer; and a front surface plate, the front surface plate includes a substrate and an inorganic reflection layer, the inorganic reflection layer is a semi-transmissive semi-reflective layer, the circular polarization reflection layer includes a cholesteric liquid crystal layer, and the cholesteric liquid crystal layer has a central wavelength of selective reflection in a visible light region. The half mirror includes in order: the ¼ wavelength plate, the circular polarization reflection layer, and the front surface plate.

20 Claims, 1 Drawing Sheet

(51) Int. Cl.
*G02B 5/30* (2006.01)
*G02B 5/26* (2006.01)

(56) References Cited

U.S. PATENT DOCUMENTS

| | | | |
|---|---|---|---|
| 2006/0204681 A1* | 9/2006 | Kim | C09K 19/2007 428/1.31 |
| 2008/0252833 A1* | 10/2008 | Nieuwkerk | B60R 1/088 349/115 |
| 2010/0177113 A1 | 7/2010 | Gay et al. | |
| 2010/0177265 A1* | 7/2010 | Jung | H01L 51/5281 349/69 |
| 2016/0349573 A1 | 12/2016 | Ohmuro et al. | |
| 2017/0199311 A1 | 7/2017 | Sakai et al. | |
| 2017/0235030 A1 | 8/2017 | Tanaka et al. | |
| 2017/0261666 A1* | 9/2017 | Anzai | A47G 1/00 |
| 2017/0261667 A1* | 9/2017 | Anzai | A47G 1/00 |

FOREIGN PATENT DOCUMENTS

| | | |
|---|---|---|
| JP | 2007-65314 A | 3/2007 |
| JP | 2011-45427 A | 3/2011 |
| JP | 2012-98649 A | 5/2012 |
| JP | 2014-201146 A | 10/2014 |
| WO | WO 2015/098906 A1 | 7/2015 |
| WO | WO 2015/186734 A1 | 12/2015 |
| WO | WO 2016/056617 A1 | 4/2016 |
| WO | WO2016/088708 * | 6/2016 |
| WO | WO 2016/088708 A1 | 6/2016 |
| WO | WO 2016/194890 A1 | 12/2016 |

OTHER PUBLICATIONS

International Preliminary Report on Patentability and Written Opinion of the International Searching Authority (forms PCT/IB/373, PCT/ISA/237 and PCT/IB/326), dated Nov. 1, 2018, for corresponding International Application No. PCT/JP2017/013882, with a Written Opinion translation.

International Search Report (form PCT/ISA/210), dated Jun. 20, 2017, for corresponding International Application No. PCT/JP2017/013882, with an English translation.

Extended European Search Report, dated Mar. 18, 2019, for European Application No. 17785770.3.

\* cited by examiner

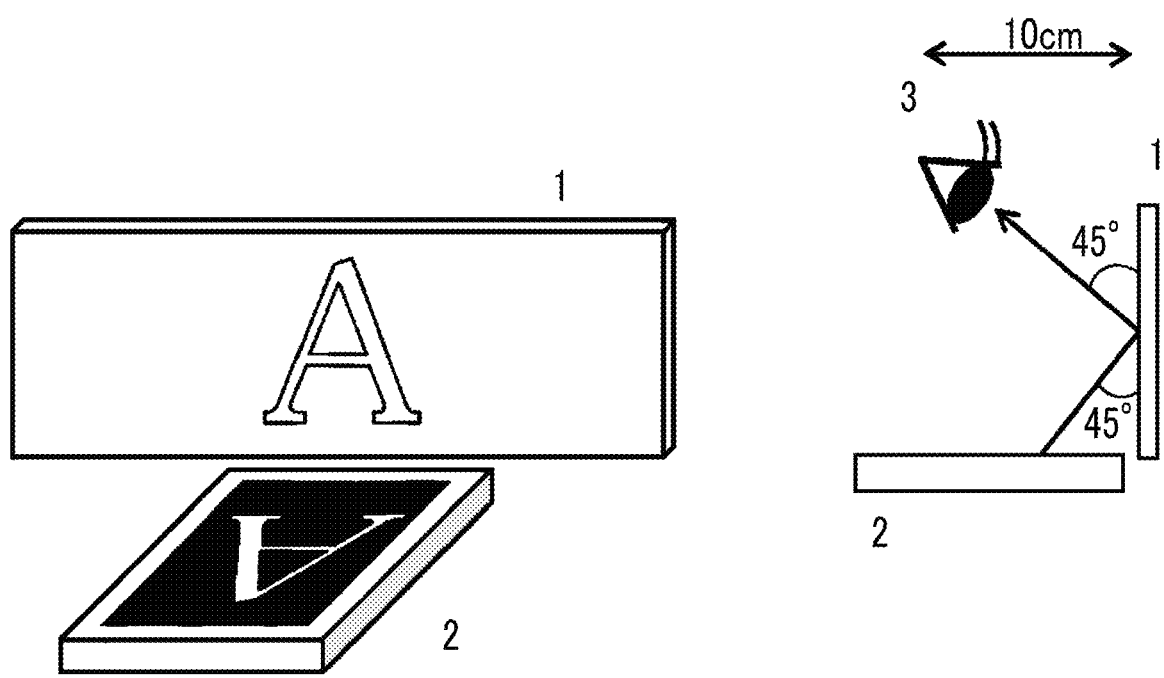

MIRROR WITH IMAGE DISPLAY FUNCTION AND HALF MIRROR

CROSS-REFERENCE TO RELATED APPLICATIONS

This application is a Continuation of PCT International Application No. PCT/JP2017/013882 filed on Apr. 3, 2017, which claims priority under 35 U.S.C. § 119(a) to Japanese Patent Application No. 2016-085025 filed on Apr. 21, 2016 and Japanese Patent Application No. 2016-169864 filed on Aug. 31, 2016. Each of the above application(s) is hereby expressly incorporated by reference, in its entirety, into the present application.

BACKGROUND OF THE INVENTION

1. Field of the Invention

The present invention relates to a mirror with an image display function and a half mirror.

2. Description of the Related Art

For example, JP2014-201146A and JP2011-045427A describe an image display device with a mirror function, in which a half mirror is provided on a surface of an image display portion of the image display device to display an image in a display mode and to function as a mirror in a non-display mode such as a power-off mode of the image display device.

JP2014-201146A discloses a configuration in which a liquid crystal display device is provided inside a housing for a vehicle mirror to display an image via a half mirror provided on a front surface of the vehicle mirror, thereby realizing image display on the mirror.

JP2011-045427A discloses a mirror with an information display function which is applied to a mirror for interior decoration, makeup, security, or safety.

SUMMARY OF THE INVENTION

In general metal deposition half mirrors, an image light transmittance and an outside light reflectance are secured by adjusting a thickness of a metal deposition layer, and in the configuration disclosed in JP2014-201146A, there is a limit to improving the brightness of an image. In addition, light absorption occurs in the metal deposition layer, and a loss is also generated in using light. JP2011-045427A describes that a linear polarization reflection plate is used as a half mirror to transmit light emitted from a liquid crystal display device without loss. However, in a case where the linear polarization reflection plate is used, the outside light reflectance cannot be adjusted to be 50% or greater in principle. In addition, the configuration using the linear polarization reflection plate as a half mirror has a problem in that a direction in which no image can be confirmed and a direction in which no mirror-reflected image can be confirmed are generated in the observation via polarized sunglasses.

An object of the invention is to provide a mirror with an image display function on which an image and a mirror-reflected image can be observed without directional dependency even via polarized sunglasses, and thus a good balance is maintained between the brightness of the mirror-reflected image and the brightness of the image, and a half mirror which realizes the mirror with an image display function.

The inventors have conducted intensive studies to achieve the object, and thought of an optical design of a half mirror in consideration of characteristics of light for image display. Based on this thought, the inventors have performed optical design and produced a half mirror using a material suitable for the optical design in combination with a material which has been used, and thus completed the invention.

The invention provides the following [1] to [20].

[1] A mirror with an image display function comprising, in order: an image display device; a ¼ wavelength plate; a circular polarization reflection layer; and a front surface plate, in which the front surface plate includes a substrate and an inorganic reflection layer, the inorganic reflection layer is a semi-transmissive semi-reflective layer, the circular polarization reflection layer includes a cholesteric liquid crystal layer, and the cholesteric liquid crystal layer has a central wavelength of selective reflection in a visible light region.

[2] The mirror with an image display function according to [1], in which the circular polarization reflection layer, the inorganic reflection layer, and the substrate are included in this order.

[3] The mirror with an image display function according to [1], in which the circular polarization reflection layer, the substrate, and the inorganic reflection layer are included in this order.

[4] The mirror with an image display function according to any one of [1] to [3], in which the substrate has a thickness of 2.0 mm or less.

[5] The mirror with an image display function according to any one of [1] to [4], in which the inorganic reflection layer has a light reflectance of 20% to 50%.

[6] The mirror with an image display function according to any one of [1] to [5], in which the inorganic reflection layer is a metal deposition layer.

[7] The mirror with an image display function according to [6], in which the metal deposition layer has a thickness of 1.0 nm to 25 nm.

[8] The mirror with an image display function according to any one of [1] to [7], in which the circular polarization reflection layer includes two or more cholesteric liquid crystal layers, and the two or more cholesteric liquid crystal layers have different central wavelengths of selective reflection.

[9] The mirror with an image display function according to [8], in which the two or more cholesteric liquid crystal layers are in direct contact with each other.

[10] The mirror with an image display function according to any one of [1] to [9], in which the circular polarization reflection layer includes three or more cholesteric liquid crystal layers, and the three or more cholesteric liquid crystal layers have different central wavelengths of selective reflection.

[11] The mirror with an image display function according to [10], in which the circular polarization reflection layer includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region.

[12] The mirror with an image display function according to any one of [1] to [11], in which the ¼ wavelength plate is composed of a layer obtained by curing a composition containing a polymerizable liquid crystal compound.

[13] The mirror with an image display function according to any one of [1] to [12], in which the circular polarization reflection layer and the ¼ wavelength plate are in direct contact with each other.

[14] The mirror with an image display function according to any one of [1] to [13], in which the image display device and the ¼ wavelength plate are adhered via an adhesive layer.

[15] A half mirror comprising, in order: a ¼ wavelength plate; a circular polarization reflection layer; and a front surface plate, in which the front surface plate includes a substrate and an inorganic reflection layer, the inorganic reflection layer is a semi-transmissive semi-reflective layer, the circular polarization reflection layer includes a cholesteric liquid crystal layer, and the cholesteric liquid crystal layer has a central wavelength of selective reflection in a visible light region.

[16] The half mirror according to [15], in which the circular polarization reflection layer, the inorganic reflection layer, and the substrate are included in this order.

[17] The half mirror according to [15], in which the circular polarization reflection layer, the substrate, and the inorganic reflection layer are included in this order.

[18] The half mirror according to any one of [15] to [17], in which the substrate has a thickness of 2.0 mm or less.

[19] The half mirror according to any one of [15] to [18], in which the inorganic reflection layer has a light reflectance of 20% to 50%.

[20] The half mirror according to any one of [15] to [19], in which the inorganic reflection layer is a metal deposition layer.

According to the invention, there are provided a novel half mirror and a mirror with an image display function using the half mirror. The mirror with an image display function according to the embodiment of the invention maintains a good balance between the brightness of a mirror-reflected image and the brightness of an image. In addition, the mirror with an image display function according to the embodiment of the invention is advantageous in that an image and a mirror-reflected image can be observed without directional dependency even via polarized sunglasses.

BRIEF DESCRIPTION OF THE DRAWINGS

FIG. 1 is a schematic diagram showing the arrangement of a half mirror and a tablet and an observation direction in the confirmation of the presence or absence of a double image in examples.

DESCRIPTION OF THE PREFERRED EMBODIMENTS

Hereinafter, the invention will be described in detail.

In this specification, "to" is used to mean that numerical values before and after "to" are included as a lower limit value and an upper limit value.

In this specification, an angle such as "45°", "parallel", "vertical", or "perpendicular" means that a difference from an exact angle is in a range less than 5° unless otherwise stated. The difference from an exact angle is preferably less than 4°, and more preferably less than 3°.

"(Meth)acrylate" is used to mean "one or both of acrylate and methacrylate".

In a case where "selectively" is used in regard to circularly polarized light, it means that the light quantity of any one of a right circular polarization component or a left circular polarization component of emitted light is greater than that of the other circular polarization component. Specifically, when "selectively" is used, the circular polarization degree of light is preferably 0.3 or greater, more preferably 0.6 or greater, and even more preferably 0.8 or greater. Substantially, the circular polarization degree is yet even more preferably 1.0.

The circular polarization degree is a value which is expressed by $|I_R-I_L|/(I_R+I_L)$ where the intensity of a right circular polarization component of light is represented by $I_R$, and the intensity of a left circular polarization component is represented by $I_L$.

When "sense" is used in regard to circularly polarized light, it means that the light is either right-circularly polarized light or left-circularly polarized light. The sense of circularly polarized light is defined such that, in a case where light is viewed as it proceeds toward an observer and in a case where the tip of an electric field vector rotates clockwise with the increase in time, the light is right-circularly polarized light, and in a case where it rotates counterclockwise, the light is left-circularly polarized light.

The term "sense" may be used in regard to a twisted direction of the helix of cholesteric liquid crystal. In a case where a twisted direction (sense) of the helix of the cholesteric liquid crystal is right-handed, the right-circularly polarized light is reflected and the left-circularly polarized light is transmitted. In a case where the sense is left-handed, the left-circularly polarized light is reflected, and the right-circularly polarized light is transmitted.

Visible light refers to light visible to the human eye, which has a wavelength of 380 nm to 780 nm among electromagnetic waves. Infrared rays (infrared light) refer to electromagnetic waves whose wavelength is longer than visible light and shorter than radio waves. Near infrared light refers to electromagnetic waves having a wavelength of 780 nm to 2,500 nm among infrared rays.

A surface of a mirror with an image display function which is on the front surface plate side with respect to a circular polarization reflection layer may be referred to as a front surface.

When "image" is used in regard to a mirror with an image display function, it means an image which can be observed by viewing the mirror with an image display function from the front surface when an image display portion of an image display device displays the image. When "mirror-reflected image" is used in regard to the mirror with an image display function, it means an image which can be observed by viewing the mirror with an image display function from the front surface when the image display portion of the image display device displays no image.

The front phase difference is a value measured using AxoScan manufactured by Axometrics, Inc. The measurement wavelength is 550 nm unless otherwise stated. As the front phase difference, a value measured by making light with a wavelength in a visible light wavelength region, such as a central wavelength of selective reflection of a cholesteric liquid crystal layer, incident in a film normal direction in KOBRA 21ADH or WR (manufactured by Oji Scientific Instruments) can also be used. In the selection of the measurement wavelength, a wavelength selective filter can be manually replaced, or the measured value can be converted by a program or the like for measurement.

<<Mirror with Image Display Function>>

A mirror with an image display function according to an embodiment of the invention includes an image display device, a ¼ wavelength plate, a circular polarization reflection layer, and a front surface plate in this order. Among the constituent elements of the mirror with an image display function, a portion including the ¼ wavelength plate, the circular polarization reflection layer, and the front surface plate may be referred to as "half mirror". In the mirror with an image display function, the image display device and the half mirror may be in direct contact with each other, or other layers may be provided therebetween. Otherwise, the image display device and the half mirror may be adhered via an adhesive layer. The image display device may be in contact with or adhered to the half mirror in at least a part of an image display portion. The area of a surface of the ¼ wavelength plate of the half mirror to be adhered may be smaller than, the same as, or larger than the area of the image display portion. An air layer may be provided between the image display device and the half mirror.

The circular polarization reflection layer and the front surface plate are preferably adhered to each other. Other layers such as an adhesive layer may or may not be included between the ¼ wavelength plate and the circular polarization reflection layer, but the ¼ wavelength plate and the circular polarization reflection layer are preferably in direct contact with each other. In addition, the ¼ wavelength plate and the circular polarization reflection layer are preferably laminated in the same area.

The area of the front surface plate may be larger than, the same as, or smaller than that of the circular polarization reflection layer. A circular polarization reflection layer may be adhered to a part of the front surface plate, and another type of reflection layer such as metal foil (for example, a reflection layer having a higher light reflectance than an inorganic reflection layer to be described later) may be adhered to or formed on the other part of the front surface plate. With such a configuration, an image can be displayed on a part of the mirror. A circular polarization reflection layer may be adhered to the entire surface of the front surface plate, an image display portion having the same area as the circular polarization reflection layer may be provided, and a ¼ wavelength plate may be adhered to the image display portion. With such a configuration, an image can be displayed on the entire mirror surface.

In a case where the ¼ wavelength plate is adhered to the image display device, angle adjustment is preferably performed such that the brightest image is displayed. That is, particularly, in order to allow linearly polarized light to be most satisfactorily transmitted through the image display device which displays an image with linearly polarized light, the relationship between a polarization direction (transmission axis) of the linearly polarized light and a slow axis of the ¼ wavelength plate is preferably adjusted. For example, in a case of a single layer-type ¼ wavelength plate, the transmission axis and the slow axis preferably form an angle of 45°. The linearly polarized light emitted from the image display device is transmitted through the ¼ wavelength plate, and then converted into circularly polarized light of any one of right sense or left sense. The circular polarization reflection layer to be described later includes a cholesteric liquid crystal layer having a twisted direction of helix, which transmits circularly polarized light of any one of right sense or left sense.

The mirror with an image display function according to the embodiment of the invention includes the ¼ wavelength plate between the image display device and the circular polarization reflection layer, and thus the linearly polarized light from the image display device can be converted into circularly polarized light and allowed to incident on the circular polarization reflection layer. Therefore, the light reflected by the circular polarization reflection layer and returning to the image display device side can be significantly reduced, and a bright image can be displayed.

<Image Display Device>

The image display device is not particularly limited. The image display device is preferably an image display device which forms an image by emitting linearly polarized light, and more preferably a liquid crystal display device.

The liquid crystal display device may be a transmission type or a reflection type, and is particularly preferably a transmission type. The liquid crystal display device may be a liquid crystal display device of any one of an in plane switching (IPS) mode, a fringe field switching (FFS) mode, a vertical alignment (VA) mode, an electrically controlled birefringence (ECB) mode, a super twisted nematic (STN) mode, a twisted nematic (TN) mode, an optically compensated bend (OCB) mode, or the like.

The image which is displayed on the image display portion of the image display device may be a still image, a motion picture, or simple texture information. The display may be monochrome display such as black and white display, multi-color display, or full-color display.

<¼ Wavelength Plate>

The ¼ wavelength plate may be a retardation layer which functions as a ¼ wavelength plate in a visible light region. Examples of the ¼ wavelength plate include a single layer-type ¼ wavelength plate and a broadband ¼ wavelength plate in which a ¼ wavelength plate and a ½ wavelength retardation plate are laminated.

The front phase difference of the former ¼ wavelength plate may be ¼ of the light emission wavelength of the image display device. For example, in a case where the light emission wavelength of the image display device is 450 nm, it is possible to use a retardation plate which exhibits inverse dispersibility and of which the front phase difference is 112.5 nm±10 nm, preferably 112.5 nm±5 nm, and more preferably 112.5 nm. In a case where the light emission wavelength of the image display device is 530 nm, it is possible to use a retardation plate which exhibits inverse dispersibility and of which the front phase difference is 132.5 nm±10 nm, preferably 132.5 nm±5 nm, and more preferably 132.5 nm. In a case where the light emission wavelength of the image display device is 640 nm, it is possible to use a retardation plate which exhibits inverse dispersibility and of which the front phase difference is 160 nm±10 nm, preferably 160 nm±5 nm, and more preferably 160 nm. A retardation plate which exhibits small wavelength dispersibility of phase difference or a retardation plate which exhibits forward dispersibility can also be used. The "inverse dispersibility" means a property that the longer the wavelength, the larger the absolute value of the phase difference. The "forward dispersibility" means a property that the shorter the wavelength, the larger the absolute value of the phase difference.

In the lamination-type ¼ wavelength plate, the ¼ wavelength plate and the ½ wavelength retardation plate are bonded such that an angle of a slow axis thereof is 60°, and thus the ½ wavelength retardation plate side is disposed on the side on which linearly polarized light is incident, and the slow axis of the ½ wavelength retardation plate intersects with the polarization surface of the incident linearly polarized light by 15° or 75°. Since the lamination-type ¼ wavelength plate exhibits good inverse dispersibility of phase difference, it can be suitably used.

The phase difference means front retardation. The phase difference can be measured using a polarization phase difference analyzer AxoScan manufactured by Axometrics, Inc. Alternatively, light having a specific wavelength may be incident in a film normal direction in KOBRA 21ADH or WR (manufactured by Oji Scientific Instruments) for measurement.

The ¼ wavelength plate is not particularly limited, and can be appropriately selected in accordance with the purpose. Examples thereof include a quartz plate, a stretched polycarbonate film, a stretched norbornene-based polymer film, a transparent film containing aligned inorganic grains having birefringence such as strontium carbonate, and a thin film in which an inorganic dielectric material is obliquely vapor-deposited on a support.

Examples of the ¼ wavelength plate include (1) a retardation plate described in JP1993-027118A (JP-H5-027118A) and JP1993-027119A (JP-H5-027119A) in which a birefringent film having large retardation and a birefringent film having small retardation are laminated such that optical axes thereof are perpendicular to each other, (2) a retardation plate described in JP1998-068816A (JP-H10-068816A) in which a polymer film having a ¼ wavelength at a specific wavelength and a polymer film made of the same material as the former polymer film and having a ½ wavelength at the same wavelength are laminated to obtain a ¼ wavelength in a wide wavelength region, (3) a retardation plate described in JP1998-090521A (JP-H10-090521A), capable of achieving a ¼ wavelength in a wide wavelength region by laminating two polymer films, (4) a retardation plate capable of achieving a ¼ wavelength in a wide wavelength region by using a modified polycarbonate film described in WO00/026705A, and (5) a retardation plate capable of achieving a ¼ wavelength in a wide wavelength region by using a cellulose acetate film described in WO00/065384A.

A commercially available product can also be used as the ¼ wavelength plate. Examples of the commercially available product include PURE-ACE WR (trade name) (manufactured by TEIJIN LIMITED).

The ¼ wavelength plate may be formed by arranging and fixing a polymerizable liquid crystal compound or a polymer liquid crystal compound. For example, the ¼ wavelength plate can be formed by coating a temporary support, an alignment layer, or a surface of the front surface plate with a liquid crystal composition, forming the polymerizable liquid crystal compound in the liquid crystal composition in a nematic alignment in a liquid crystal state, and then fixing the alignment by photo-crosslinking or thermal crosslinking. Details of the liquid crystal composition or the producing method thereof will be described later. The ¼ wavelength plate may be a layer which is obtained by coating a temporary support, an alignment layer, or a surface of the front surface plate with a liquid crystal composition containing a polymer liquid crystal compound, forming the compound in a nematic alignment in a liquid crystal state, and then fixing the alignment by cooling. The thickness of the ¼ wavelength plate is not particularly limited. The thickness is preferably 0.2 to 10 µm, and more preferably 0.5 to 2 µm.

<Circular Polarization Reflection Layer>

The mirror with an image display function according to the embodiment of the invention uses a circular polarization reflection layer, and thus can reflect incident light from the front surface as circularly polarized light and transmit incident light from the image display device as circularly polarized light. Therefore, in the mirror with an image display function according to the embodiment of the invention, it is possible to observe an image and a mirror-reflected image through polarized sunglasses without depending on the relationship between the transmission axis direction of the polarized sunglasses and the horizontal direction of the mirror with an image display function.

The circular polarization reflection layer includes at least one cholesteric liquid crystal layer exhibiting selective reflection in a visible light region. The circular polarization reflection layer may include two or more cholesteric liquid crystal layers, and may include other layers such as an alignment layer. The circular polarization reflection layer preferably consists only of a cholesteric liquid crystal layer. In a case where the circular polarization reflection layer includes a plurality of cholesteric liquid crystal layers, these are preferably in direct contact with an adjacent cholesteric liquid crystal layer. The circular polarization reflection layer preferably includes three or more cholesteric liquid crystal layers.

The thickness of the circular polarization reflection layer is preferably in a range of 2.0 µm to 300 µm, and more preferably in a range of 8.0 to 200 µm.

[Cholesteric Liquid Crystal Layer]

The cholesteric liquid crystal layer means a layer in which a cholesteric liquid crystalline phase is fixed. The cholesteric liquid crystal layer may be simply referred to as a "liquid crystal layer".

The cholesteric liquid crystalline phase has been known to exhibit circularly polarized light selective reflection in which circularly polarized light of any one sense of either right-circularly polarized light or left-circularly polarized light is selectively reflected and circularly polarized light of the other sense is selectively transmitted in a specific wavelength region. The circularly polarized light selective reflection may be simply referred to as "selective reflection".

As a film including a layer in which a cholesteric liquid crystalline phase exhibiting a circularly polarized light selective reflection property is fixed, many films formed from a composition containing a polymerizable liquid crystal compound have been known, and regarding the cholesteric liquid crystal layer, the related arts can be referred to.

The cholesteric liquid crystal layer may be a layer in which alignment of a liquid crystal compound in a cholesteric liquid crystalline phase is held. Typically, the cholesteric liquid crystal layer may be a layer obtained in such a manner that a polymerizable liquid crystal compound is allowed to be in an alignment state of a cholesteric liquid crystalline phase, and polymerized and cured by ultraviolet irradiation, heating, and the like to form a layer having no fluidity, and at the same time, the layer is changed such that the form of alignment is not changed by an external field or an external force. In the cholesteric liquid crystal layer, the optical properties of the cholesteric liquid crystalline phase just need to be held in the layer, and the liquid crystal compound in the layer may not exhibit liquid crystallinity. For example, the molecular weight of the polymerizable liquid crystal compound may be increased by a curing reaction, and the liquid crystallinity may be lost.

The cholesteric liquid crystal layer has a central wavelength of selective reflection in a visible light region.

A central wavelength $\lambda$ of selective reflection of the cholesteric liquid crystal layer depends on a pitch P (periodicity of helix) of a helical structure in a cholesteric phase, and has a relationship of $\lambda = n \times P$ with an average refractive index n of the cholesteric liquid crystal layer. The central wavelength $\lambda$ of selective reflection of the cholesteric liquid crystal layer means a wavelength at a centroid position of a reflection peak of a circular polarization reflection spectrum measured in the normal direction of the cholesteric liquid crystal layer. The central wavelength of selective reflection means a central wavelength when measured in the normal direction of the cholesteric liquid crystal layer.

As is obvious from the above formula, the central wavelength of selective reflection can be adjusted by adjusting the pitch of the helical structure. By adjusting the n value and the P value, any one of right-circularly polarized light or left-circularly polarized light is selectively reflected with respect to light with a desired wavelength, and thus the central wavelength λ can be adjusted.

In a case where light is obliquely incident on the cholesteric liquid crystal layer, the central wavelength of selective reflection shifts to the short wavelength side. Therefore, with respect to the wavelength of selective reflection necessary for image display, n×P is preferably adjusted such that λ calculated in accordance with the above formula λ=n×P becomes a long wavelength. In a case where the central wavelength of selective reflection when light rays pass through a cholesteric liquid crystal layer with a refractive index $n_2$ in a normal direction of the cholesteric liquid crystal layer (a helical axis direction of the cholesteric liquid crystal layer) at an angle of $\theta_2$ is represented by $\lambda_d$, $\lambda_d$ is expressed by the following formula.

$$\lambda_d = n_2 \times P \times \cos \theta_2$$

Resulting from the above-described selective reflection property, the mirror with an image display function according to the embodiment of the invention may cause a tint change in an image and a mirror-reflected image viewed from an oblique direction. The tint change in a mirror-reflected image can be prevented in a case where a cholesteric liquid crystal layer having a central wavelength of selective reflection in an infrared light region is included in the circular polarization reflection layer. In this case, the central wavelength of selective reflection in an infrared light region may be 780 to 900 nm, and preferably 780 to 850 nm.

Since the pitch of the cholesteric liquid crystalline phase depends on the type or the concentration of a chiral agent which is used together with the polymerizable liquid crystal compound, a desired pitch can be obtained by adjusting the type or the concentration. Methods described in "Introduction to Liquid Crystal Chemical Test", p. 46, edited by Japan Liquid Crystal Society, published by Sigma Publications, 2007, and "Liquid Crystal Handbook", p. 196, Liquid Crystal Handbook Editing Committee Maruzen can be used as a method of measuring the sense or the pitch of the helix.

In the mirror with an image display function according to the embodiment of the invention, the circular polarization reflection layer preferably includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region. The reflection layer preferably includes, for example, a cholesteric liquid crystal layer having a central wavelength of selective reflection in 400 nm to 500 nm, a cholesteric liquid crystal layer having a central wavelength of selective reflection in 500 nm to 580 nm, and a cholesteric liquid crystal layer having a central wavelength of selective reflection in 580 nm to 700 nm.

In a case where the circular polarization reflection layer includes a plurality of cholesteric liquid crystal layers, a cholesteric liquid crystal layer closer to the image display device preferably has a longer central wavelength of selective reflection. Due to such a configuration, a tint change when observed in the image display portion and in a mirror-reflected image can be suppressed.

In a case where the central wavelength of selective reflection of the cholesteric liquid crystal layer to be used is adjusted in accordance with the emission peak wavelength of the image display device and the use mode of the circular polarization reflection layer, a bright image can be displayed with high light utilization efficiency. Examples of the use mode of the circular polarization reflection layer include an incidence angle of light on the circular polarization reflection layer and an image observation direction.

The sense of the reflected circularly polarized light of the cholesteric liquid crystal layer is identical to the sense of the helix. As each cholesteric liquid crystal layer, a cholesteric liquid crystal layer in which the sense of the helix is right-handed or left-handed is used in accordance with the sense of the circularly polarized light transmitted through the ¼ wavelength plate. Specifically, the cholesteric liquid crystal layer has a sense of a helix which transmits circularly polarized light of a sense obtained by emission of linearly polarized light from the image display device and transmission of the light through the ¼ wavelength plate. In a case where a plurality of cholesteric liquid crystal layers are included in the circular polarization reflection layer, the senses of the helices thereof are preferably the same.

A half-width Δλ (nm) of a selective reflection band in which selective reflection is exhibited depends on the birefringence Δn of the liquid crystal compound and the pitch P, and has a relationship of Δλ=Δn×P therewith. Therefore, the width of the selective reflection band can be controlled by adjusting Δn. Δn can be adjusted by adjusting the type or the mixing ratio of the polymerizable liquid crystal compound or controlling the temperature at the time of alignment fixing.

In order to form one type of cholesteric liquid crystal layers having the same central wavelength of selective reflection, a plurality of cholesteric liquid crystal layers having the same pitch P and the same sense of the helix may be laminated. By laminating cholesteric liquid crystal layers having the same pitch P and the same sense of the helix, the circular polarization selectivity can be increased at a specific wavelength.

<Method of Producing ¼ Wavelength Plate and Cholesteric Liquid Crystal Layer>

Hereinafter, materials and methods for producing the ¼ wavelength plate and the cholesteric liquid crystal layer formed from a liquid crystal composition will be described.

Examples of the material used for the ¼ wavelength plate include a liquid crystal composition containing a polymerizable liquid crystal compound. Examples of the material used for the cholesteric liquid crystal layer preferably include a liquid crystal composition further containing a chiral agent (optically active compound). If necessary, the liquid crystal composition mixed with a surfactant, a polymerization initiator, or the like and dissolved in a solvent or the like can be used. In order to form the ¼ wavelength plate or the cholesteric liquid crystal layer, a support, a temporary support, an alignment layer, a ¼ wavelength plate, a cholesteric liquid crystal layer, or the like is coated with the liquid crystal composition, and after alignment and maturing, the liquid crystal composition is cured to fix the alignment. The cholesteric liquid crystal layer can also be formed by transferring the liquid crystal composition applied to a support.

[Polymerizable Liquid Crystal Compound]

A rod-like liquid crystal compound may be used as the polymerizable liquid crystal compound.

Examples of the rod-like polymerizable liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexyl benzonitriles are preferably used. It is possible to use not only a low-molecular liquid crystal compound, but also a polymer liquid crystal compound.

The polymerizable liquid crystal compound is obtained by introducing a polymerizable group in a liquid crystal compound. Examples of the polymerizable group include an unsaturated polymerizable group, an epoxy group, and an aziridinyl group. An unsaturated polymerizable group is preferable, and an ethylenically unsaturated polymerizable group is particularly preferable. The polymerizable group can be introduced in molecules of a liquid crystal compound by various methods. The number of the polymerizable groups in the polymerizable liquid crystal compound is preferably 1 to 6, and more preferably 1 to 3. Examples of the polymerizable liquid crystal compound include those described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more types of polymerizable liquid crystal compounds may be used in combination. Using two or more types of polymerizable liquid crystal compounds in combination may contribute to lowering the alignment temperature.

The amount of the polymerizable liquid crystal compound added in the liquid crystal composition is preferably 80 to 99.9 mass %, more preferably 85 to 99.5 mass %, and particularly preferably 90 to 99 mass % with respect to the solid content mass of the liquid crystal composition (mass excluding the mass of the solvent).

[Chiral Agent: Optically Active Compound]

The chiral agent functions to induce the helical structure of the cholesteric liquid crystalline phase. The chiral compound may be selected in accordance with the purpose since compounds are different in the helix pitch or the sense of the helix to be induced.

The chiral agent is not particularly limited, and a known compound (for example, compounds described in Liquid Crystal Device Handbook, Third Chapter, Section 4-3, Chiral Agent for TN or STN, p. 199, edited by No. 142 Committee of Japan Society for the Promotion of Science, in 1989, isosorbide, isomannide derivative, or the like) can be used. As a chiral agent which exhibits a strong twisting force allowing achievement of a desired helix pitch even in a small amount, for example, a chiral agent described in JP2003-287623A can also be used. Further examples thereof include chiral agents described in JP2002-302487A, JP2002-080478A, JP2002-080851A, and JP2014-034581A, and LC-756 manufactured by BASF SE.

In general, the chiral agent contains asymmetric carbon atoms. However, an axial asymmetric compound or a planar asymmetric compound containing no asymmetric carbon atoms can also be used as a chiral agent. Examples of the axial asymmetric compound or the planar asymmetric compound include binaphthyl, helicene, paracyclophane, and their derivatives. The chiral agent may have a polymerizable group. In a case where all of the chiral agent and the liquid crystal compound have a polymerizable group, the polymerization reaction of the polymerizable chiral agent and the polymerizable liquid crystal compound can give a polymer having a repeating unit derived from the polymerizable liquid crystal compound and a repeating unit derived from the chiral agent. In this embodiment, the polymerizable group of the polymerizable chiral agent is preferably the same type as the polymerizable group of the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

The content of the chiral agent in the liquid crystal composition is preferably 0.01 mol % to 200 mol %, and more preferably 1.0 mol % to 30 mol % with respect to the total molar amount of the polymerizable liquid crystal compound.

[Polymerization Initiator]

The liquid crystal composition preferably contains a polymerization initiator. In an embodiment in which a polymerization reaction is carried out by ultraviolet irradiation, a polymerization initiator to be used is preferably a photopolymerization initiator capable of initiating a polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combination of triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A). For example, the description in paragraphs 0500 to 0547 of JP2012-208494A can also be referred to. As the polymerization initiator, an oxime compound is also preferably used. Specific examples of the oxime compound include compounds described in JP2001-233842A, JP2000-080068A, JP2006-342166A, JP2013-114249A, JP2014-137466A, JP4223071B, JP2010-262028A, and JP2014-500852A. Commercially available products such as IRGACURE-OXE01 (manufactured by BASF SE), IRGACURE-OXE02 (manufactured by BASF SE), TR-PBG-304 (manufactured by Changzhou Tronly New Electronic Materials CO., LTD), ADEKA ARKLS NCI-831, ADEKA ARKLS NCI-930 (manufactured by ADEKA Corporation), and ADEKA ARKLS NCI-831 (manufactured by ADEKA Corporation) are also included.

The polymerization initiators may be used alone or in combination of two or more types thereof.

The content of the polymerization initiator in the liquid crystal composition is preferably 0.1 to 20 mass %, and more preferably 0.5 mass % to 5.0 mass % with respect to the content of the polymerizable liquid crystal compound.

[Crosslinking Agent]

The liquid crystal composition may contain an arbitrary crosslinking agent in order to improve the film hardness after curing and durability. As the crosslinking agent, a material which is curable with ultraviolet rays, heat, moisture, or the like can be suitably used.

The crosslinking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. A known catalyst can be used depending on the reactivity of the crosslinking agent in order to enhance productivity in addition to the enhancement of the film hardness and the durability. These may be used alone or in combination of two or more types thereof.

The content of the crosslinking agent is preferably 3 mass % to 20 mass %, and more preferably 5 mass % to 15 mass % with respect to the total mass of the liquid crystal composition. In a case where the content of the crosslinking agent is 3 mass % or greater, the crosslinking density improving effect can be obtained. In a case where the content of the crosslinking agent is 20 mass % or less, the stability of a layer to be formed can be prevented from being reduced.

[Alignment Control Agent]

In the liquid crystal composition, an alignment control agent may be added to contribute to stable or rapid planar alignment. Examples of the alignment control agent include fluorine (meth)acrylate-based polymers described in paragraphs [0018] to [0043] in JP2007-272185A and compounds represented by Formulae (I) to (IV) described in paragraphs [0031] to [0034] in JP2012-203237A.

The alignment control agents may be used alone or in combination of two or more types thereof.

The amount of the alignment control agent added in the liquid crystal composition is preferably 0.01 mass % to 10 mass %, more preferably 0.01 mass % to 5 mass %, and particularly preferably 0.02 mass % to 1 mass % with respect to the total mass of the polymerizable liquid crystal compound.

[Other Additives]

The liquid crystal composition may contain at least one selected from various additives such as a surfactant for uniformizing the film thickness by adjusting the surface tension of the coating film and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

[Solvent]

The solvent used to prepare the liquid crystal composition is not particularly limited, and can be appropriately selected in accordance with the purpose. An organic solvent is preferably used.

The organic solvent is not particularly limited, and can be appropriately selected in accordance with the purpose. Examples thereof include ketones, alkyl halides, amides, sulfoxides, heterocyclic compounds, hydrocarbons, esters, and ethers. These may be used alone or in combination of two or more types thereof. Among these, ketones are particularly preferable in consideration of the load imposed on the environment.

[Coating, Alignment, and Polymerization]

The method of coating a temporary support, an alignment layer, a ¼ wavelength plate, a cholesteric liquid crystal layer, or the like with a liquid crystal composition is not particularly limited, and can be appropriately selected in accordance with the purpose. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. By heating the liquid crystal composition applied, the liquid crystal molecules are aligned. In the formation of the cholesteric liquid crystal layer, the liquid crystal molecules are preferably aligned in a cholesteric manner, and in the formation of the ¼ wavelength plate, the liquid crystal molecules are preferably aligned in a nematic manner. In the cholesteric alignment, the heating temperature is preferably equal to or lower than 200° C., and more preferably equal to or lower than 130° C. By this alignment, an optical thin film is obtained in which the polymerizable liquid crystal compound is aligned in a twisted manner to have a helical axis in a direction substantially perpendicular to the surface of the film.

In the nematic alignment, the heating temperature is preferably 50° C. to 120° C., and more preferably 60° C. to 100° C.

The aligned liquid crystal compound can be further subjected to polymerization so as to cure the liquid crystal composition. The polymerization may be any one of thermal polymerization or photopolymerization using light irradiation, but is preferably photopolymerization. Ultraviolet rays are preferably used for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably equal to or higher than 70%, and more preferably equal to or higher than 80%. The rate of the polymerization reaction can be determined by measuring the consumption rate of polymerizable functional groups by using an IR (infrared) absorption spectrum.

The thickness of each cholesteric liquid crystal layer is not particularly limited as long as it is in such a range that the above-described characteristics are exhibited. The thickness is preferably in a range of 1.0 μm to 150 μm, and more preferably in a range of 4.0 μm to 100 μm.

[Temporary Support, Support, and Alignment Layer]

The liquid crystal composition may be coated on a surface of a temporary support or an alignment layer formed on the surface of the temporary support to form a layer. The temporary support, or the temporary support and the alignment layer may be peeled off after the formation of the layer. Particularly, when the ¼ wavelength plate is formed, a support may be used. The support may not be peeled off after the formation of the layer. Examples of the temporary support and the support include polyester such as polyethylene terephthalate (PET), polycarbonate, an acrylic resin, an epoxy resin, polyurethane, polyamide, polyolefin, a cellulose derivative, silicone, and a glass plate.

The alignment layer can be provided by means of rubbing of an organic compound (resin such as polyimide, polyvinyl alcohol, polyester, polyarylate, polyamideimide, polyether imide, polyamide, and modified polyamide) such as a polymer, oblique vapor deposition of an inorganic compound, formation of a layer having microgrooves, or accumulation of an organic compound (for example, w-tricosanoic acid, dioctadecylmethylammonium chloride, or methyl stearate) using a Langmuir-Blodgett method (LB film). Furthermore, an alignment layer may be used which obtains an orientation function by the application of an electric field or a magnetic field or by being irradiated with light.

Particularly, it is preferable that an alignment layer composed of a polymer is rubbed, and then the rubbed surface is coated with the liquid crystal composition. The rubbing can be performed by rubbing the surface of the polymer layer several times with paper or cloth in a certain direction.

The liquid crystal composition may be coated on a surface of a temporary support or a rubbed surface of a temporary support without providing the alignment layer.

The thickness of the alignment layer is preferably 0.01 to 5 µm, and more preferably 0.05 to 2 µm.

[Lamination Film of ¼ Wavelength Plate and Cholesteric Liquid Crystal Layer]

As described above, in order to form the ¼ wavelength plate and the cholesteric liquid crystal layer, a liquid crystal composition in which a polymerizable liquid crystal compound and a polymerization initiator, and further, a chiral agent, a surfactant or the like, which are added as necessary, are dissolved in a solvent is coated on a temporary support, an alignment layer, a ¼ wavelength plate, a previously produced cholesteric liquid crystal layer, or the like, and dried to obtain a coating film, the polymerizable liquid crystal compound is aligned in a desired form in the coating film, and then the polymerizable compound is polymerized to fix the alignment. A laminate of layers formed from a polymerizable liquid crystal compound can be formed by repeating the above-described steps. A part of the layer or a part of the lamination film may be separately prepared and bonded by an adhesive layer.

In the formation of a lamination film of a lamination film of a ¼ wavelength plate and a cholesteric liquid crystal layer, a lamination film composed of a plurality of cholesteric liquid crystal layers, or a lamination film composed of a ¼ wavelength plate and a plurality of cholesteric liquid crystal layers, a step of directly coating a surface of a ¼ wavelength plate or a front cholesteric liquid crystal layer with a liquid crystal composition containing a polymerizable liquid crystal compound and the like, an alignment step, and a fixing step may be repeated. Otherwise, a ¼ wavelength plate, a cholesteric liquid crystal layer, or a laminate thereof prepared separately may be laminated using an adhesive or the like. However, the former is preferable. The reason for this is that interference unevenness that may occur resulting from the thickness unevenness of the adhesive layer is not observed.

In addition, the reason for this is that in a lamination film of cholesteric liquid crystal layers, in a case where a cholesteric liquid crystal layer is formed so as to be in direct contact with a surface of a cholesteric liquid crystal layer formed previously, an alignment direction of liquid crystal molecules on the air interface side of the cholesteric liquid crystal layer formed previously is identical to an alignment direction of liquid crystal molecules on the lower side of the cholesteric liquid crystal layer formed thereon, and the polarization characteristics of the laminate of the cholesteric liquid crystal layers are enhanced.

<Front Surface Plate>

The mirror with an image display function according to the embodiment of the invention has a front surface plate.

The front surface plate may have a plate shape or a film shape, or have a curved surface. The front surface plate may be flat or curved. Such a curved front surface plate can be produced using, for example, a curved substrate. The curved substrate can be produced by a plastic processing method such as injection molding. In injection molding, for example, raw material plastic pellets are melted by heat, injected into a mold, and solidified by cooling, and thus a resin product can be obtained.

The front surface plate includes a substrate and an inorganic reflection layer. The front surface plate may be substantially composed of a substrate and an inorganic reflection layer, but may include an inorganic barrier layer for preventing deterioration of the inorganic reflection layer, an undercoat layer required for forming the inorganic reflection layer, or the like.

In the mirror with an image display function according to the embodiment of the invention, either the substrate or the inorganic reflection layer may be on the circular polarization reflection layer side. That is, the mirror with an image display function may have a configuration in which a circular polarization reflection layer, an inorganic reflection layer, and a substrate are included in this order, or a configuration in which a circular polarization reflection layer, a substrate, and an inorganic reflection layer are included in this order.

As will be shown in examples to be described later, the inventors have found that by providing a circular polarization reflection layer, an inorganic reflection layer, and a substrate in this order, a mirror-reflected image has the same brightness (for example, 50% or greater of reflectance) as that in a mirror with an image display function using only a metal deposition layer as a reflection layer without a circular polarization reflection layer, and in a case where an image display device emitting linearly polarized light is included, image the image becomes brighter. Further, the inventors have found that the image becomes even brighter in a case where the circular polarization reflection layer, the substrate, and the inorganic reflection layer are provided in this order. The brightness of a mirror-reflected image of a mirror with an image display function formed using a half mirror including a specific ¼ wavelength plate, a circular polarization reflection layer, and a front surface plate can be determined by a light reflectance when visible light (natural light) is made incident from the front surface of the half mirror. In addition, the brightness of a mirror-reflected image of a mirror with an image display function formed using a half mirror including a specific ¼ wavelength plate, a circular polarization reflection layer, and a front surface plate can be determined by a light transmittance (may be referred to as "linearly polarized light transmittance") that can be achieved when linearly polarized light of visible light is made incident from the ¼ wavelength plate side of the half mirror. Although the above-described differences are unexpected, the latter configuration is presumed to contribute to the following: among the light originating from the linearly polarized light from the image display device, the light reflected from the metal deposition layer in the mirror with an image display function can be reflected again from the circular polarization reflection layer and transmitted through the front surface plate.

The light transmittance is obtained by a method described in JIS A5759. That is, the transmittance is measured at wavelengths of 380 nm to 780 nm using a spectrophotometer, and multiplied by a weight value coefficient obtained from a spectral distribution of the International Commission on Illumination (CIE) daylight D65 and a wavelength distribution and a wavelength interval of CIE spectral luminous efficiency for photopic vision to calculate a weighted average, and thus the light transmittance is obtained.

The light reflectance means a numerical value calculated based on a visible light calculation method described in JIS A5759. That is, the reflectance is measured at wavelengths of 380 nm to 780 nm using a spectrophotometer, and multiplied by a weight value coefficient obtained from a spectral distribution of the International Commission on Illumination (CIE) daylight D65 and a wavelength distribution and a wavelength interval of CIE spectral luminous efficiency for photopic vision to calculate a weighted average, and thus the light reflectance is obtained.

As the spectrophotometer used in obtaining a light transmittance and a light reflectance, for example, a spectrophotometer "V-670" manufactured by JASCO Corporation can be used.

[Substrate]

The substrate is not particularly limited. As the substrate, a glass plate or a plastic plate which is used for manufacturing a normal mirror can be used. The substrate is preferably transparent in a visible light region. Transparent in a visible light region means that the light transmittance is 80% or greater, and preferably 85% or greater. In addition, the substrate preferably has small birefringence. For example, the front phase difference may be 20 nm or less, preferably less than 10 nm, and more preferably 5 nm or less.

Examples of the plastic used for the plastic plate include polycarbonate, an acrylic resin, an epoxy resin, polyurethane, polyamide, polyolefin, a cellulose derivative, and silicone.

The thickness of the substrate may be approximately 100 μm to 10 mm, preferably 200 μm to 5.0 mm, more preferably 200 μm to 2.0 mm, and even more preferably 500 μm to 1.0 mm.

In a case where a circular polarization reflection layer, a substrate, and an inorganic reflection layer are provided in this order, the thickness of the substrate is preferably 2.0 mm or less, more preferably less than 2.0 mm, even more preferably 1.0 mm or less, and particularly preferably 0.80 mm or less. In a case where a circular polarization reflection layer, a substrate, and an inorganic reflection layer are provided in this order, when observed from an oblique direction forming an angle relative to the normal direction of the mirror with an image display function, a double image based on the reflected light from the circular polarization reflection layer and the reflected light from the inorganic reflection layer is easy to view. However, by setting the thickness to 2.0 mm or less, it is possible to make viewing the double image difficult.

[Inorganic Reflection Layer]

The inorganic reflection layer has an unpolarized light reflection property. In the layer having an unpolarized light reflection property, the light is not polarization-separated. That is, the inorganic reflection layer may be a reflection layer which does not correspond to a linear polarization reflection layer or a circular polarization reflection layer.

By using the inorganic reflection layer together with the circular polarization reflection layer, the mirror with an image display function according to the embodiment of the invention can display a bright image and provide a bright mirror-reflected image. For example, it is also possible to adjust the light reflectance on the front surface side to 50% or greater.

The inorganic reflection layer is a semi-transmissive semi-reflective layer. That is, the inorganic reflection layer functions to transmit light emitted from the image display device during image display, such that an image is displayed on the front surface of the vehicle mirror, and during no image display, the inorganic reflection layer functions to reflect at least a part of incident light from the front direction, such that the front surface of the vehicle mirror serves as a mirror.

The light reflectance of the inorganic reflection layer may be 20% to 50%, and preferably 30% to 45%. The above-described light reflectance of the inorganic reflection layer can be obtained from the result of the measurement performed by making light incident from the surface side on which the inorganic reflection layer is formed with respect to the front surface plate obtained by forming the inorganic reflection layer on the substrate. In a case where the front surface plate includes an inorganic barrier layer for preventing deterioration of the inorganic reflection layer, the light reflectance may be obtained from the result of the measurement performed by making light incident from the surface side on which the inorganic barrier layer is formed. The inorganic reflection layer may be formed on at least one surface of the substrate. The inorganic reflection layer is preferably formed on one surface of the substrate. The inorganic reflection layer may be formed on the entire surface of the substrate or formed in a part of the surface of the substrate.

Examples of the inorganic reflection layer include a metal film and a dielectric multi-layer film.

(Metal Film)

The material for forming the metal film is not particularly limited as long as it is a metallic material reflecting visible light, and examples thereof include aluminum, silver, and a silver alloy. Regarding a silver alloy, in view of improving the durability of the metal film, other metals such as at least one selected from metals of the group consisting of gold, palladium, copper, nickel, iron, gallium, indium, titanium, and bismuth may be included to the extent that the reflection characteristics of the metal film is not affected. As a silver alloy, an alloy of silver and one or more metals selected from gold, copper, nickel, iron and palladium is particularly preferable from the viewpoint of moisture/heat resistance, light reflectance, and the like.

The thickness of the metal film may be set so as to secure sufficient reflection in accordance with the material for forming the metal film. For example, the thickness is preferably 0.5 nm to 50 nm, and more preferably 1.0 nm to 25 nm.

Examples of the method of forming a metal film include chemical vapor deposition (CVD) methods such as a vacuum vapor deposition method, a sputtering method, and a plasma chemical vapor deposition (plasma enhanced chemical vapor deposition, PECVD) method and physical vapor deposition (PVD) methods such as an ion plating method. The metal film is particularly preferably a metal deposition layer formed by a vacuum vapor deposition method. The metal film can be formed by performing the above-described method using the substrate as a base material.

Between the substrate and the metal film, a metal undercoat layer containing other metals such as copper, nickel, chromium, and iron, an undercoat polymer layer, or the like may be provided.

An inorganic barrier layer may be provided on a surface of the metal film to prevent deterioration based on moisture or the like of the metal film.

As the constituent material of the inorganic barrier layer, for example, an oxide, nitride, carbide, oxynitride, or oxycarbide including one or more metals selected from silicon (Si), aluminum (Al), indium (In), tin (Sn), zinc (Zn), titanium (Ti), copper (Cu), cerium (Ce), and tantalum (Ta) is preferably used. Of these, an oxide, nitride, or oxynitride of a metal selected from silicon, aluminum, indium, tin, zinc, and titanium is more preferable, and an oxide, nitride, or oxynitride of a metal selected from silicon and aluminum is particularly preferable. The inorganic barrier layer may contain other elements as a subcomponent.

The method of forming an inorganic barrier layer is not particularly limited, and for example, a physical vapor deposition (PVD) method such as a vacuum vapor deposition method, a sputtering method, or an ion plating method, or a chemical vapor deposition (CVD) method such as a plasma chemical vapor deposition (plasma enhanced chemical vapor deposition, PECVD) method is suitable. Specifically, forming methods described in JP3400324B, JP2002-322561A, and JP2002-361774A can be employed.

The thickness of the inorganic barrier layer is not particularly limited as long as the transmission of moisture or the like in the atmosphere can be suppressed. However, in view of realizing a film mirror having more excellent moisture/heat resistance, the thickness is preferably 5.0 nm to 200 nm, and in view of realizing a film mirror which is more excellent in reflection property, moisture/heat resistance, and bending resistance, the thickness is more preferably 10 nm to 100 nm.

(Dielectric Multi-Layer Film)

As the dielectric multi-layer film, a dielectric multi-layer film having an unpolarized light reflection property is used.

The dielectric multi-layer film can be produced by, for example, alternately laminating a plurality of dielectric thin films having a high refractive index and a plurality of dielectric thin films having a low refractive index on the substrate. The number of layer types is not limited to two, and two or more types may be used. The number of layers is preferably 2 to 12, more preferably 2 to 8, and even more preferably 4 to 6.

The order of laminating the dielectric thin films is not particularly limited, and can be appropriately selected in accordance with the purpose. For example, in a case where the refractive indices of films adjacent to each other are high, a film having a lower refractive index is laminated first. Inversely, in a case where the refractive indices of films adjacent to each other are low, a film having a higher refractive index is laminated first. The refractive index is determined to be high or low based on a refractive index of 1.8. The criterion for determining whether a refractive index is high or low is not absolute. Among materials having a high refractive index, there may be materials having a relatively high refractive index and materials having a relatively low refractive index, and these may be alternately used.

Examples of the material of the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Among these, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferable, and among these, $SiO$, $Ta_2O_5$, $TiO_2$, $Y_2O_3$, $ZnSe$, $ZnS$, and $ZrO_2$ are particularly preferable.

Examples of the material of the dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, and $ThF_4$. Among these, $Al_2O_3$, $BiF_3$, $CaF_2$, $MgF_2$, $MgO$, $SiO_2$, and $Si_2O_3$ are preferable, and $Al_2O_3$, $CaF_2$, $MgF_2$, $MgO$, $SiO_2$, and $Si_2O_3$ are particularly preferable.

The material of the dielectric thin film is not particularly limited in terms of the atomic ratio, and can be appropriately selected in accordance with the purpose. The atomic ratio can be adjusted by changing the concentration of an atmospheric gas during the film formation.

The method of forming a dielectric thin film is not particularly limited, and can be appropriately selected in accordance with the purpose. Examples thereof include physical vapor deposition methods (PVD methods) such as ion plating, a vacuum vapor deposition method using ion beams, and sputtering, and chemical vapor deposition methods (CVD methods). Among these, a vacuum vapor deposition method and a sputtering method are preferable, and a sputtering method is particularly preferable.

As the sputtering method, a DC sputtering method with a high film forming rate is preferable. In the DC sputtering method, materials having high conductivity are preferably used.

In addition, examples of the method of forming a multi-layer film through the sputtering method include an one-chamber method in which films are formed alternately or sequentially from a plurality of targets in a single chamber and a multi-chamber method in which films are continuously formed in a plurality of chambers. Among these, a multi-chamber method is preferable from the viewpoint of productivity and prevention of contamination of the materials.

The thickness of the dielectric thin film is preferably $\lambda/16$ to $\lambda/2$, and more preferably $\lambda/8$ to $3\lambda/8$ in order of optical wavelength.

<Adhesive Layer>

The mirror with an image display function according to the embodiment of the invention may include an adhesive layer for adhesion between the image display device and the ¼ wavelength plate, between the ¼ wavelength plate and the circular polarization reflection layer, between the circular polarization reflection layer and the front surface plate, and between other respective layers. The adhesive layer may be formed from an adhesive.

Adhesives are classified into hot-melt types, thermosetting types, photocurable types, reaction-curable types, and pressure-sensitive types which do not require curing. As the materials of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, or the like. From the viewpoint of workability and productivity, photocuring is preferable as the curing method. From the viewpoint of optical transparency and heat resistance, materials based on acrylate, urethane acrylate, epoxy acrylate, or the like are preferably used.

The adhesion between the circular polarization reflection layer and the front surface plate may be carried out using a high-transparency adhesive transfer tape (OCA tape). A commercially available product for an image display device, particularly, a commercially available product for a surface of an image display portion of an image display device may be used as the high-transparency adhesive transfer tape. Examples of the commercially available product include pressure sensitive sheets (such as PD-S1) manufactured by PANAC Corporation, and pressure sensitive sheets of MHM series manufactured by NICHIEI KAKOH CO., LTD. As the OCA, a tape having an ultraviolet absorbing function may be used. This is to prevent deterioration of other members (circular polarization reflection layer, image display device, and the like) caused by ultraviolet rays. Examples of the commercially available product include MHM-UVC130 manufactured by NICHIEI KAKOH CO., LTD.

The adhesion between the front surface plate and the circular polarization reflection layer may be performed on a surface on the substrate side of the front surface plate or on a surface on the inorganic reflection layer side.

During the course of studies of a mirror with an image display function, the inventors have found that a mirror-reflected image observed from the front surface side in a case where the front surface plate and the circular polarization reflection layer including a cholesteric liquid crystal layer are adhered by an OCA tape may have visually recognizable distortion. This was due to the orange peel-like unevenness of the OCA tape. In addition, the inventors have found that brightness unevenness may be observed in the same mirror-reflected images in accordance with conditions. The reason for this was thought to be that, for example, in the consideration of application as a vehicle mirror, outside light through a rear glass of a vehicle may be reflected and distribution unevenness of birefringence of the in-vehicle rear glass is visually recognized.

In the mirror with an image display function according to the embodiment of the invention, as will be shown in example, by using the inorganic reflection layer together with the circular polarization reflection layer, the above-described distortion is unlikely to be confirmed, and the above-described brightness unevenness is unlikely to be confirmed even in a case where an OCA tape is used for adhesion between the front surface plate and the circular polarization reflection layer.

The thickness of the adhesive layer is preferably 0.50 μm to 50 μm, and more preferably 1.0 μm to 25 μm.

<Half Mirror>

The half mirror can be formed with the circular polarization reflection layer, the ¼ wavelength plate, and the front surface plate. The half mirror may be produced by forming the circular polarization reflection layer and the ¼ wavelength plate in this order on the front surface plate, or by transferring the ¼ wavelength plate and the circular polarization reflection layer formed on a temporary support to the front surface plate. For example, the ¼ wavelength plate and the cholesteric liquid crystal layer are sequentially formed on a temporary support to form a laminate of the ¼ wavelength plate and the circular polarization reflection layer, and a surface of the circular polarization reflection layer is adhered to the front surface plate. Then, if necessary, the temporary support is peeled off, and thus a half mirror can be obtained. The temporary support may function as a protective film until the ¼ wavelength plate and the circular polarization reflection layer are adhered to the image display device.

<Method of Producing Mirror with Image Display Function>

The mirror with an image display function according to the embodiment of the invention can be produced by arranging the ¼ wavelength plate side of a half mirror including a circular polarization reflection layer, a ¼ wavelength plate, and a front surface plate on the surface of an image display portion of an image display device. Then, if necessary, the image display device and the half mirror may be integrally formed. The image display device and the half mirror may be integrally formed by connection in an outer frame or a hinge, or adhesion.

<Use of Mirror with Image Display Function>

The use of the mirror with an image display function according to the embodiment of the invention is not particularly limited. For example, the mirror can be used as a security mirror, a mirror for a hair salon or a barbershop, or the like, and can display images such as texture information, still images, and moving images. Further, the mirror with an image display function according to the embodiment of the invention may be a rearview mirror for a vehicle, or may be used for televisions, personal computers, smartphones, or cell phones.

EXAMPLES

Hereinafter, the invention will be described in more detail with reference to examples. The materials, the reagents, the amounts of materials, the proportions thereof, the operations, and the like which will be shown in the following examples can be appropriately modified within a range not departing from the gist of the invention. Accordingly, the scope of the invention is not limited to the following examples.

<Production of Front Surface Plate>

Al (metallic aluminum) was uniformly vapor-deposited on a glass plate having a thickness of 1.8 mm by a vacuum vapor deposition method to form a metal film having a thickness of 10 nm. A silicon oxide (SiO) was vapor-deposited in a thickness of 50 nm as an inorganic barrier layer on a surface of the metal film to produce a front surface plate. Light was made incident from the inorganic barrier layer side (incidence angle: 25°), a reflection spectrum at wavelengths of 380 nm to 780 nm was measured using a spectrophotometer "V-670" manufactured by JASCO Corporation, and a light reflectance was calculated based on a visible light calculation method described in JIS A5759. The light reflectance was 42.9%.

<Preparation of Coating Liquid for Forming Cholesteric Liquid Crystal Layer>

(1) A coating liquid 1 for a retardation layer and coating liquids 2 to 4 for forming a cholesteric liquid crystal layer were prepared with the following compositions shown in Table 1.

TABLE 1

| Type | Material Name (manufacturer) | Coating Liquid 1 (retardation layer) | Coating Liquid 2 (630 nm) | Coating Liquid 3 (540 nm) | Coating Liquid 4 (450 nm) |
| --- | --- | --- | --- | --- | --- |
| Rod-Like Liquid Crystal Compound | Compound 1 shown below | 100 parts by mass | 100 parts by mass | 100 parts by mass | 100 parts by mass |
| Chiral Agent for Right Twist | PALIOCOLOR LC756 (BASF SE) | None | 4.5 parts by mass | 5.3 parts by mass | 6.5 parts by mass |
| Polymerization Initiator | Irgacure OXE01 (BASF SE) | 1 part by mass | 1 part by mass | 1 part by mass | 1 part by mass |
| Alignment Control Agent | Compound 2 shown below | 0.1 parts by mass | 0.1 parts by mass | 0.1 parts by mass | 0.1 parts by mass |
| Solvent | 2-Butanone (FUJIFILM Wako Pure Chemical Corporation) | 170 parts by mass | 170 parts by mass | 170 parts by mass | 170 parts by mass |

Rod-Like Liquid Crystal Compound: Compound 1

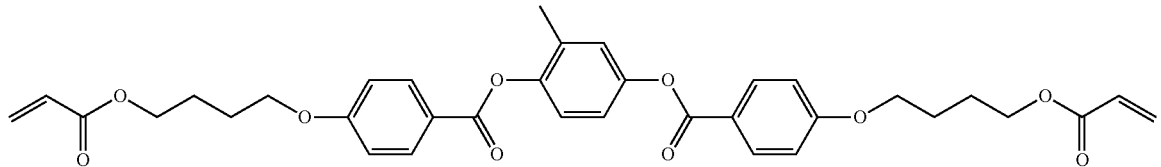 [SMILES: C=CC(=O)OCCCCOc1ccc(C(=O)Oc2ccc(OC(=O)c3ccc(OCCCCOC(=O)C=C)cc3)c(C)c2)cc1]

Alignment Control Agent: Compound 2

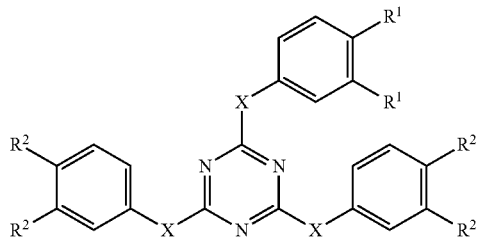

| R¹ | R² | X |
|---|---|---|
| $O(CH_2)_2O(CH_2)_2(CF_2)_6F$ | $O(CH_2)_2O(CH_2)_2(CF_2)_6F$ | NH |

The compound 2 was prepared by a method described in JP2005-099248A.

<Production of Half Mirror>

Example 1

(1) A PET film (COSMOSHINE A4100, thickness: 100 μm) manufactured by TOYOBO CO., LTD. was used as a temporary support (280 mm×85 mm), and rubbed (rayon cloth, pressure: 0.1 kgf (0.98 N), rotation speed: 1,000 rpm, transport speed: 10 m/min, number of times: one reciprocation).

(2) The rubbed surface of the PET film was coated with the coating liquid 1 using a wire bar. After that, the coating liquid was dried, and then the PET film was put on a hot plate at 30° C. The coating liquid 1 on the PET film was irradiated with UV light for 6 seconds using an electrodeless lamp "D-BULB" (60 mW/cm$^2$) manufactured by HERAEUS to fix the liquid crystalline phase, and thus a retardation layer having a thickness of 0.65 μm was formed. A part of the obtained retardation layer was cut out and bonded to an acrylic plate (thickness: 0.3 mm) using a pressure sensitive sheet (PD-S1) manufactured by PANAC Corporation. Next, the PET film was peeled off and Re of the retardation layer was measured using AxoScan manufactured by Axometrics, Inc. Re of the retardation layer at a wavelength of 500 nm was confirmed to be 115 nm.

The surface of the retardation layer formed on the PET film was coated with the coating liquid 2 using a wire bar. After that, the coating liquid was dried, and then the PET film was put on a hot plate at 30° C. The coating liquid 2 on the retardation layer was irradiated with UV light for 6 seconds using an electrodeless lamp "D-BULB" (60 mW/cm$^2$) manufactured by HERAEUS to fix the cholesteric liquid crystalline phase, and thus a cholesteric liquid crystal layer having a thickness of 3.5 μm was formed. The same step was repeated using the coating liquids 3 and 4, and a laminate A (layer of coating liquid 3: 3.0 μm, layer of coating liquid 4: 2.7 μm) of the ¼ wavelength plate and three cholesteric liquid crystal layers was obtained. The transmission spectrum of the laminate A was measured using a spectrophotometer (manufactured by JASCO Corporation, V-670), and a transmission spectrum having a central wavelength of selective reflection at 630 nm, 540 nm and 450 nm was obtained.

(3) The cholesteric liquid crystal layer side of the laminate A was bonded to the deposition surface side of the front surface plate using a pressure sensitive sheet (PD-S1, thickness: 25 μm) manufactured by PANAC Corporation, and then the PET film was peeled off. Thus, a half mirror A was obtained.

Example 2

A half mirror B was produced in the same manner as in Example 1, except that the cholesteric liquid crystal layer side of the laminate A was bonded to the glass plate side (non-deposition surface) of the front surface plate in bonding between the laminate A and the front surface plate.

Comparative Example 1

Al (metallic aluminum) was uniformly vapor-deposited on a glass plate having a thickness of 1.8 mm by a vacuum vapor deposition method to form a metal film having a thickness of 14 nm. A silicon oxide (SiO) was vapor-deposited in a thickness of 50 nm as an inorganic barrier layer on a surface of the metal film to produce a half mirror C.

Comparative Example 2

A half mirror D was produced in the same manner as in Example 2, except that a glass plate having a thickness of 4.0 mm was used in place of the glass plate having a thickness of 1.8 mm in the production of the half mirror B.

Comparative Example 3

A half mirror E was produced in the same manner as in Example 1, except that a glass plate having a thickness of 1.8 mm was used in place of the front surface plate used in Example 1 in the production of the half mirror A.

Example 3

A half mirror F was produced in the same manner as in Example 1, except that a pressure sensitive sheet (MHM-UVC130) manufactured by NICHIEI KAKOH CO., LTD. was used in place of the pressure sensitive sheet (PD-S1, thickness: 25 μm) manufactured by PANAC Corporation in the production of the half mirror A.

<Production of Mirror with Image Display Function>

The half mirror produced as described above was taped up on a surface of an image display portion of an image display device (iPad (registered trade name) Retina) (emission peak wavelength, 450 nm (B), 545 nm (G), 610 nm (R)) such that the retardation layer was on the image display device side, and thus a mirror with an image display function was produced. In this case, a slow axis of the retardation layer was disposed at an angle tilted by 45° with respect to a transmission axis (the polarization direction of light emission of the image display device) of the image display device.

<Evaluation of Distortion of Mirror-Reflected Image of Mirror with Image Display Function>

Distortion (degree of orange peel-like unevenness) was evaluated by measuring the sharpness of a mirror-reflected image using ICM-IT manufactured by Suga Test Instruments Co., Ltd. based on JIS K 7374. The measurement was performed in a reflection mode at an incident light angle of 45° (with respect to the vertical direction of the sample surface), and an optical comb of 0.125 mm (the ratio between the light shielding portion and the transmission portion was 1:1) was employed. A mirror displaying a mirror-reflected image having a sharpness of 70% or greater was represented by A, and a mirror displaying a mirror-reflected image having a sharpness of less than 70% was represented by B. Mirrors represented by A are in practical use.

<Evaluation of Brightness Unevenness of Mirror-Reflected Image of Mirror with Image Display Function>

The mirror with an image display function produced as above was attached as an inner mirror of a vehicle (vehicle type: 2002 model-year step wagon manufactured by Honda Motor Co., Ltd.). The mirror was attached such that the front surface plate was on the observer side (driver side). In a state in which outside light was made incident from a rear glass of a vehicle to a position of an inner mirror on a sunny day, a mirror-reflected image was observed, and the presence or absence of brightness unevenness (diagonal line-like unevenness derived from the birefringence of the rear glass) was confirmed.

<Measurement of Light Reflectance>

The half mirror was detached from the mirror with an image display function, and a reflection spectrum at 380 nm to 780 nm at an incidence angle of 25° was measured with a spectrophotometer V-670 manufactured by JASCO Corporation. In this case, in the half mirrors A, B, D, and E, the light source of the spectrophotometer, the glass plate, and the circular polarization reflection layer were disposed in this order so as to make light incident from the side opposite to the retardation layer. As the measurement of the light reflectance of the half mirror C, measurement in which the light was reflected on the glass plate side, that is, the light source, the glass plate, and the inorganic reflection layer were disposed in this order, and measurement in which the light was reflected on the inorganic reflection layer side, that is, the light source, the inorganic reflection layer, and the glass plate were disposed in this order were performed.

The light reflectance was calculated based on a visible light calculation method described in JIS A5759 using the reflection spectrum data.

<Measurement of Linearly Polarized Light Transmittance>

A polarizing plate was disposed between an incident light source of a spectrophotometer V-670 manufactured by JASCO Corporation and a sample holder such that the transmission axis thereof was in the vertical direction to take a base line. Then, a transmittance spectrum of the half mirror at 380 nm to 780 nm was measured at an incidence angle of 0°. In this case, in the half mirrors A, B, D, and E, the light source, the circular polarization reflection layer, and the glass plate were disposed in this order such that an angle of 45° was formed between the slow axis of the retardation layer and the transmission axis of the polarizing plate and the light was made incident from the retardation layer side. In the half mirror C, as the measurement corresponding to the reflection on the glass plate side, measurement in which the light source, the inorganic reflection layer, and the glass plate were disposed in this order was performed, and as the measurement corresponding to the reflection on the inorganic reflection layer side, measurement in which the light source, the glass plate, and the inorganic reflection layer were disposed in this order was performed.

The linearly polarized light transmittance was calculated based on a method described in JIS A5759 using the transmittance spectrum data.

<Confirmation of Presence or Absence of Double Image on Mirror-Reflected Image of Mirror with Image Display Function>

The half mirror was disposed such that the front surface thereof was on the observation side in the arrangement shown in FIG. 1, and a double image on a mirror-reflected image of the letter displayed on the tablet was visually confirmed.

TABLE 2

| | Light Reflectance | Linearly Polarized Light Transmittance | Double Image | Distortion | Brightness Unevenness |
|---|---|---|---|---|---|
| Example 1 [half mirror A] | 60.9% | 44.3% | None | A | None |
| Example 2 [half mirror B] | 51.3% | 52.6% | None | A | None |
| Comparative Example 1 [half mirror C] (reflection on glass plate side) | 61.0% | 24.0% | None | A | None |
| (reflection on inorganic reflection layer side) | 58.5% | 24.0% | None | A | None |
| Comparative Example 2 [half mirror D] | 50.1% | 52.6% | Presence | A | None |
| Comparative Example 3 [half mirror E] | 40.1% | 88.1% | None | B | Presence |
| Example 3 [half mirror F] | 60.9% | 44.3% | None | A | None |

EXPLANATION OF REFERENCES

1: half mirror
2: tablet
3: observation position

What is claimed is:

1. A mirror with an image display function comprising, in order:
   an image display device;
   a ¼ wavelength plate;
   a circular polarization reflection layer; and
   a front surface plate,
   wherein the front surface plate includes a substrate and an inorganic reflection layer, the inorganic reflection layer is a semi-transmissive semi-reflective layer, the circular polarization reflection layer includes a cholesteric liquid crystal layer, and the cholesteric liquid crystal layer has a central wavelength of selective reflection in a visible light region.

2. The mirror with an image display function according to claim 1, wherein the circular polarization reflection layer, the inorganic reflection layer, and the substrate are included in this order.

3. The mirror with an image display function according to claim 1, wherein the circular polarization reflection layer, the substrate, and the inorganic reflection layer are included in this order.

4. The mirror with an image display function according to claim 1, wherein the substrate has a thickness of 2.0 mm or less.

5. The mirror with an image display function according to claim 1, wherein the inorganic reflection layer has a light reflectance of 20% to 50%.

6. The mirror with an image display function according to claim 1, wherein the inorganic reflection layer is a metal deposition layer.

7. The mirror with an image display function according to claim 6, wherein the metal deposition layer has a thickness of 1.0 nm to 25 nm.

8. The mirror with an image display function according to claim 1, wherein the circular polarization reflection layer includes two or more cholesteric liquid crystal layers, and the two or more cholesteric liquid crystal layers have different central wavelengths of selective reflection.

9. The mirror with an image display function according to claim 8, wherein the two or more cholesteric liquid crystal layers are in direct contact with each other.

10. The mirror with an image display function according to claim 1, wherein the circular polarization reflection layer includes three or more cholesteric liquid crystal layers, and the three or more cholesteric liquid crystal layers have different central wavelengths of selective reflection.

11. The mirror with an image display function according to claim 10, wherein the circular polarization reflection layer includes a cholesteric liquid crystal layer having a central wavelength of selective reflection in a red light wavelength region, a cholesteric liquid crystal layer having a central wavelength of selective reflection in a green light wavelength region, and a cholesteric liquid crystal layer having a central wavelength of selective reflection in a blue light wavelength region.

12. The mirror with an image display function according to claim 1, wherein the ¼ wavelength plate is composed of a layer obtained by curing a composition containing a polymerizable liquid crystal compound.

13. The mirror with an image display function according to claim 1, wherein the circular polarization reflection layer and the ¼ wavelength plate are in direct contact with each other.

14. The mirror with an image display function according to claim 1, wherein the image display device and the ¼ wavelength plate are adhered via an adhesive layer.

15. A half mirror comprising, in order:

a ¼ wavelength plate;

a circular polarization reflection layer; and a front surface plate, wherein the front surface plate includes a substrate and an inorganic reflection layer, the inorganic reflection layer is a semi-transmissive semi-reflective layer, the circular polarization reflection layer includes a cholesteric liquid crystal layer, and the cholesteric liquid crystal layer has a central wavelength of selective reflection in a visible light region.

16. The half mirror according to claim 15, wherein the circular polarization reflection layer, the inorganic reflection layer, and the substrate are included in this order.

17. The half mirror according to claim 15, wherein the circular polarization reflection layer, the substrate, and the inorganic reflection layer are included in this order.

18. The half mirror according to claim 15, wherein the substrate has a thickness of 2.0 mm or less.

19. The half mirror according to claim 15, wherein the inorganic reflection layer has a light reflectance of 20% to 50%.

20. The half mirror according to claim 15, wherein the inorganic reflection layer is a metal deposition layer.

* * * * *